UNITED STATES PATENT OFFICE.

LUDWIG KNORR, OF JENA, ASSIGNOR TO THE FARBWERKE, VORMALS MEISTER, LUCIUS & BRÜNING, OF HÖCHST-ON-THE-MAIN, GERMANY.

PARATOLYLDIMETHYLPYRAZOLONE.

SPECIFICATION forming part of Letters Patent No. 516,707, dated March 20, 1894.

Application filed February 24, 1893. Serial No. 463,662. (Specimens.) Patented in Germany July 22, 1883, No. 26,429.

*To all whom it may concern:*

Be it known that I, LUDWIG KNORR, doctor of philosophy, a subject of the Emperor of Germany, residing at Jena, in the Empire of Germany, have invented certain new and useful Improvements in the Production of Paratolyldimethylpyrazolone, (for which I have obtained German Patent No. 26,429, dated July 22, 1883;) and I do hereby declare the following to be a full, clear, and exact description of the invention, such as will enable others skilled in the art to which it appertains to make and use the same.

My invention has for its object to produce paratolyldimethylpyrazolone in the form of colorless prisms or plates the same being derived from paratolylhydrazin, having the formula:

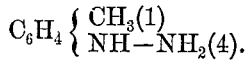

When a sufficiently large number of molecules of para-tolylhydrazin and acetyl acetic ether are mixed water is separated and para-tolyl-phenyl acetic ether crystallizes out in the form of pretty crystals melting at a point between 91° and 93° centigrade. On being heated at from 130° to 140° centigrade this product under separation of alcohol transforms into the para-tolyl-methyl-pyrazolone, which after having been washed with ether, has a melting point of 140° centigrade. By submitting it to the action of iodid of methyl and methyl alcohol at 100° centigrade the corresponding para-tolyl-dimethyl-pyrazolone is obtained in the form of a beautifully crystallizing body which melts at 137° centigrade. The body crystallizes in the form of colorless prisms or plates, is easy of solubility in water and difficultly soluble in ether and it has the composition $C_{12}H_{14}N_2O$. The product serves as a medicine and may be used in febrile symptoms and to reduce temperature. A dose is from eight to twenty-five grains.

Having thus described the product, what I claim as new, and desire to secure by Letters Patent, is—

1. The herein described process for producing paratolyldimethylpyrazolone which consists in condensing paratolyl hydrazin with acetyl acetic ether, separating water and then heating to eliminate alcohol, as described, and methylizing the product of the condensation, substantially as herein set forth.

2. As a new article of manufacture paratolyldimethylpyrazolone, derived from para tolylhydrazin, crystallizing in colorless prisms or plates of easy solubility in water, of difficult solubility in ether, melting at 137° centigrade and having the formula $C_{12}H_{14}N_2O$; as and for the purpose set forth.

In testimony whereof I affix my signature in presence of two witnesses.

LUDWIG KNORR.

Witnesses:
P. TEICHMANN,
P. KUDEN.